(12) United States Patent
Brading

(10) Patent No.: US 11,546,514 B1
(45) Date of Patent: Jan. 3, 2023

(54) REDUCING FALSE TRIGGERS IN MOTION-ACTIVATED CAMERAS

(71) Applicant: Synaptics Incorporated, San Jose, CA (US)

(72) Inventor: Michael Charles Brading, Milpitas, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/495,576

(22) Filed: Oct. 6, 2021

(51) Int. Cl.
*H04N 5/232* (2006.01)

(52) U.S. Cl.
CPC ..... *H04N 5/23258* (2013.01); *H04N 5/23218* (2018.08); *H04N 5/23254* (2013.01)

(58) Field of Classification Search
CPC ........... H04N 5/23258; H04N 5/23218; H04N 5/23254
See application file for complete search history.

(56) References Cited

U.S. PATENT DOCUMENTS

| | | | | |
|---|---|---|---|---|
| 9,906,722 B1 * | 2/2018 | Gigot | ..................... | H04N 5/772 |
| 10,778,887 B1 * | 9/2020 | Xu | ..................... | H04N 5/23219 |
| 11,076,099 B1 * | 7/2021 | Xu | ..................... | H04N 5/23258 |
| 11,195,398 B1 * | 12/2021 | Fu | ............................ | G06V 20/52 |
| 11,350,060 B1 * | 5/2022 | Mitura | ..................... | H04N 5/33 |
| 2016/0006988 A1 * | 1/2016 | Zhao | ..................... | H04N 7/181 348/155 |
| 2018/0048825 A1 * | 2/2018 | Wang | ..................... | G02B 13/02 |
| 2018/0205911 A1 * | 7/2018 | Siminoff | ................ | H04N 7/142 |

\* cited by examiner

*Primary Examiner* — Jason A Flohre
(74) *Attorney, Agent, or Firm* — Paradice & Li LLP

(57) ABSTRACT

This disclosure provides methods, devices, and systems for controlling motion-activated cameras. The present implementations more specifically relate to reducing false triggers in motion-activated camera systems. In some implementations, a motion-activated camera system may include a camera, a first motion sensor having a wide field-of-view (FOV), and a second motion sensor having a narrow FOV. In some aspects, the motion-activated camera system may be configured to operate in a wide-FOV mode or a narrow-FOV mode. In some implementations, the first motion sensor may trigger the camera to capture images of a scene responsive to motion detected in the wide FOV when the system is configured to operate in the wide-FOV mode. In some other implementations, the second motion sensor may trigger the camera to capture images of the scene responsive to motion detected in the narrow FOV when the system is configured to operate in the narrow-FOV mode.

20 Claims, 10 Drawing Sheets

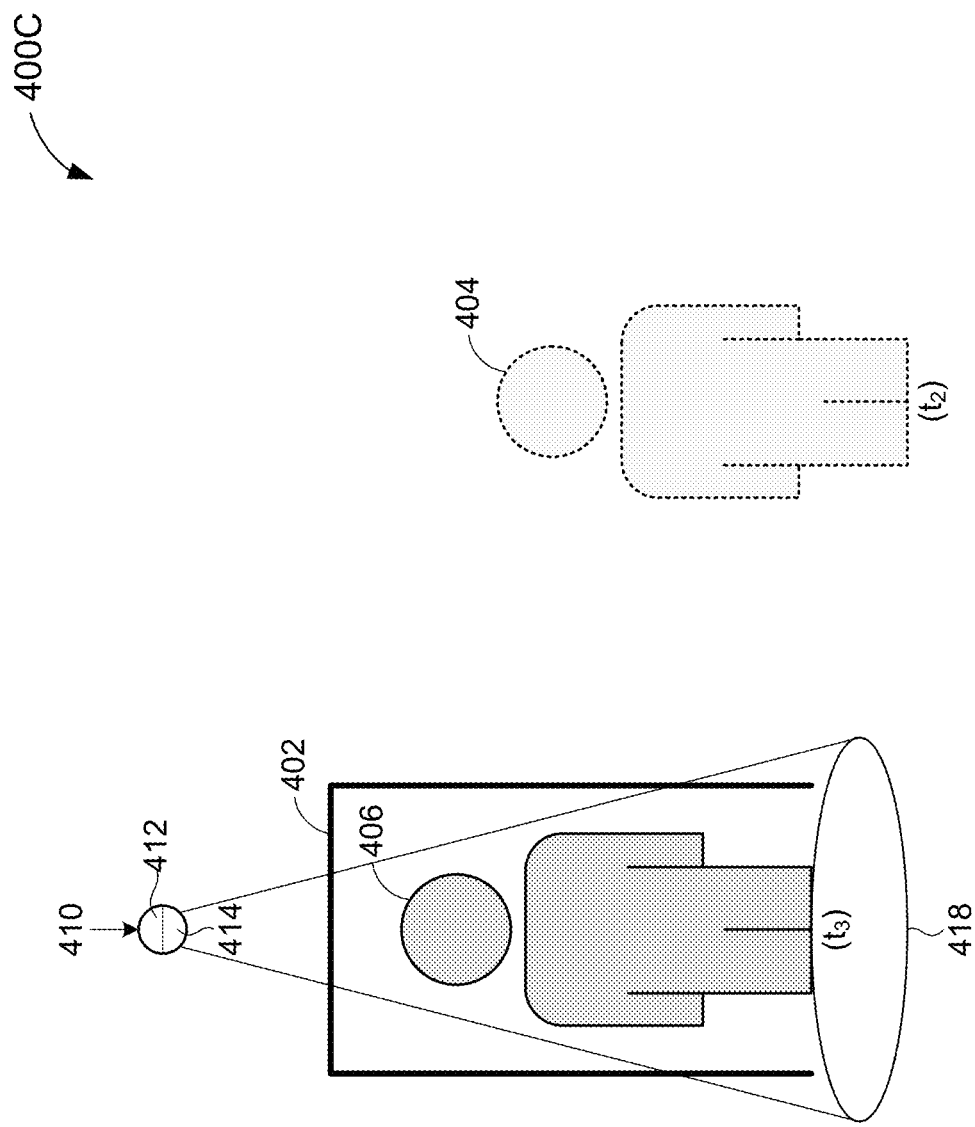

REDUCING FALSE TRIGGERS IN MOTION-ACTIVATED CAMERAS

TECHNICAL FIELD

The present implementations relate generally to camera systems, and specifically to reducing false triggers in motion-activated cameras.

BACKGROUND OF RELATED ART

Motion-activated camera systems rely on motion-based triggers for camera activation or image capture. For example, a motion-activated camera system may include a camera and a motion sensor (such as a passive infrared (PIR) or microwave (MW) sensor). The motion sensor outputs an activation signal upon detecting motion (such as a moving object) in its field-of-view (FOV). The activation signal triggers the camera to capture images (or video) of a scene. Such images may be used for various applications including, but not limited to, surveillance, people counting, or security. Compared to cameras, motion sensors consume very little power, memory, and processing resources. As such, motion-activated camera systems are well-suited for wireless or battery-powered operation.

A people counter (also referred to as a "footfall counter") is a type of motion-activated camera system that counts the number of people in a given space or region (such as a room or building). For example, the camera system may be positioned above (or facing) an entryway to a room so that the camera can capture images of people entering or exiting the room. More specifically, the motion sensor may activate the camera when motion is detected in its FOV (such as a threshold distance away from the entryway). A processor of the camera system may execute a people counting application that detects people in the captured images (based on computer vision or other object detection techniques) and tracks their movements (such as to determine whether they are entering or exiting the room).

To ensure accurate tracking of objects entering or exiting the room, the motion sensor should have a wide FOV that allows early motion detection and activation of the camera. However, motion sensors with wide FOVs are also susceptible to false triggers. A false trigger may occur if the motion sensor detects motion in its FOV, but the people counting application fails to detect any person entering or exiting the room. As such, false triggers may unnecessarily drain a motion-activated camera system's power, memory, or processing resources. Thus, new people counting techniques are needed to ensure accurate tracking of objects while reducing false triggers.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method for controlling a camera system. The method includes steps of monitoring an output of a first motion sensor having a first field-of-view (FOV), where the output of the first motion sensor indicates whether motion is detected in the first FOV; triggering a camera to capture one or more first images of a scene responsive to the output of the first motion sensor indicating that motion is detected in the first FOV; determining that the scene includes a persistent object of interest based on the one or more first images; monitoring an output of a second motion sensor having a second FOV based on determining that the scene includes the persistent object of interest, where the output of the second motion sensor indicates whether motion is detected in the second FOV; and triggering the camera to capture one or more second images of the scene responsive to the output of the second motion sensor indicating that motion is detected in the second FOV.

Another innovative aspect of the subject matter of this disclosure can be implemented in a controller for a camera system that includes a processing system and a memory. The memory stores instructions that, when executed by the processing system, cause the controller to monitor an output of a first motion sensor having a first FOV, where the output of the first motion sensor indicates whether motion is detected in the first FOV; trigger a camera to capture one or more first images of a scene responsive to the output of the first motion sensor indicating that motion is detected in the first FOV; determine that the scene includes a persistent object of interest based on the one or more first images; monitor an output of a second motion sensor having a second FOV based on determining that the scene includes the persistent object of interest, where the output of the second motion sensor indicates whether motion is detected in the second FOV; and trigger the camera to capture one or more second images of the scene responsive to the output of the second motion sensor indicating that motion is detected in the second FOV.

Another innovative aspect of the subject matter of this disclosure can be implemented in camera system including a camera, a first motion sensor having a first FOV, and a second motion sensor having a second FOV. The camera system further includes a controller configured to monitor an output of the first motion sensor that indicates whether motion is detected in the first FOV; trigger the camera to capture one or more first images of a scene responsive to the output of the first motion sensor indicating that motion is detected in the first FOV; determine that the scene includes a persistent object of interest based on the one or more first images; monitor an output of the second motion sensor based on determining that the scene includes the persistent object of interest, where the output of the second motion sensor indicates whether motion is detected in the second FOV; and trigger the camera to capture one or more second images of the scene responsive to the output of the second motion sensor indicating that motion is detected in the second FOV.

BRIEF DESCRIPTION OF THE DRAWINGS

The present implementations are illustrated by way of example and are not intended to be limited by the figures of the accompanying drawings.

FIGS. 4A-4D show example changes to a people-counting environment over a period of time.

DETAILED DESCRIPTION

Figure 1:
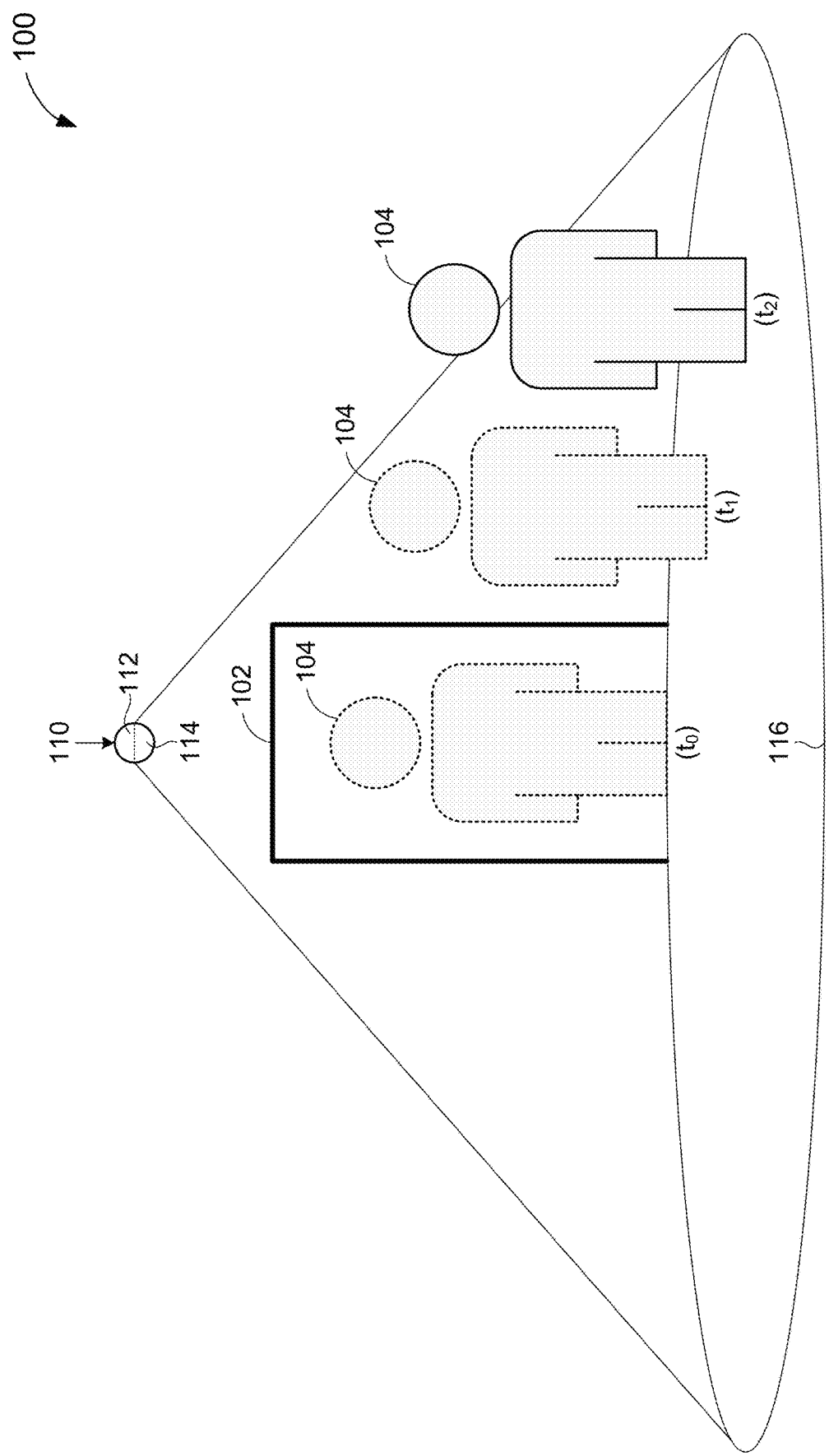
FIG. 1 shows an example people-counting environment.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Various aspects relate generally to motion-activated camera systems, and more particularly, to reducing false triggers in motion-activated cameras. In some aspects, a motion-activated camera system may include a camera, a first motion sensor having a wide field-of-view (FOV), and a second motion sensor having a narrow FOV. The first and second motion sensors may utilize any suitable motion sensing technologies including, but not limited to, passive infrared (PIR), microwave (MW), area reflective, or ultrasonic. In some aspects, the motion-activated camera system may be configured to operate in a wide-FOV mode or a narrow-FOV mode. In some implementations, the first motion sensor may trigger the camera to capture images of a scene responsive to motion detected in the wide FOV when the system is configured to operate in the wide-FOV mode. In some other implementations, the second motion sensor may trigger the camera to capture images of the scene responsive to motion detected in the narrow FOV when the system is configured to operate in the narrow-FOV mode.

In some aspects, the motion-activated camera system may switch between the wide-FOV mode and the narrow-FOV mode based on a presence of one or more persistent objects of interest in the FOV of the first motion sensor. As used herein, the term "object of interest" refers to any moving object that can be detected by the first motion sensor, triggering the camera to capture one or more images of a scene. An object of interest that persists or otherwise remains in the FOV of the first motion sensor across multiple camera triggers is referred to herein as a "persistent object of interest." In some implementations, the motion-activated camera system may switch from the wide-FOV mode to the narrow-FOV mode responsive to detecting a persistent object of interest in the FOV of the first motion sensor. In some other implementations, the motion-activated camera system may switch from the narrow-FOV mode back to the wide-FOV mode responsive to determining that the persistent object of interest has left the FOV of the first motion sensor.

Particular implementations of the subject matter described in this disclosure can be implemented to realize one or more of the following potential advantages. Aspects of the present disclosure may reduce false triggers in motion-activated camera systems by using multiple motion sensors to control activation of the camera. As described above, a false trigger occurs when a moving object in the FOV of a motion sensor causes the camera to capture one or more images of a scene, but the movement of the object fails to satisfy a condition required by an application associated with the motion-activated camera system. For example, a persistent object of interest that does not enter or exit a given room may continuously cause false triggers in a people counter configured to count the number of people in the room. By selectively operating in a wide-FOV mode or a narrow-FOV mode, a motion-activated camera system may reduce false triggers in the presence of persistent objects of interest while ensuring early motion detection in the absence of such objects. As a result, aspects of the present disclosure may reduce power, memory, or processing resources of motion-activated camera systems.

FIG. 1 shows an example people-counting environment 100. The example environment 100 includes an entryway (or doorway) 102 and a motion-activated camera 110. In the example of FIG. 1, the motion-activated camera 110 may be implemented as a people counter configured to count a number of persons (or objects of interest) passing through the entryway 102. Thus, as shown in FIG. 1, the motion-activated camera 110 is positioned above, and facing, the entryway 102.

The motion-activated camera 110 includes an image capture component 112 and a motion sensing component 114 having an FOV 116. The motion sensing component 114 is configured to detect movement of objects in its FOV 116. The image capture component 112 is configured to capture one or more images of a scene (such as the environment 100) responsive to movement detected by the motion sensing component 114. For example, the motion sensing component 114 may generate or output a motion trigger or signal responsive to detecting movement in its FOV 116. The motion trigger activates or otherwise causes the image capture component 112 to capture images of the environment 100.

The motion-activated camera 110 analyzes the captured images to determine whether a person (or other object of interest) is entering or exiting the environment 100 via the entryway 102. For example, the motion-activated camera 110 may include a processor (not shown for simplicity) that executes a people counting application. The people counting application may detect one or more persons in the captured images and track their movements relative to the environment 100. More specifically, the people counting application may determine whether a person crosses a threshold region in the captured images (such as the entryway 102) and may update a count value each time a person crosses the threshold. For example, the people counting application may increment the count value when a person enters the environment 100 and may decrement the count value when a person exits the environment 100.

The people counting application may determine a person's direction of movement (such as whether the person is entering or exiting the environment 100) based on changes in the person's location or position within the environment 100 across two or more images (or frames of video). More specifically, the accuracy with which the people counting application can determine the person's direction of movement may depend on the number of images over which the person is tracked. A motion sensing component 114 with a wide FOV 116 allows the motion-activated camera 110 to detect persons in the environment 100, and determine their directions of movement, well before they reach the threshold region (such as the entryway 102). However, motion sensors with wider FOVs are also more susceptible to false triggers.

For example, FIG. 1 shows a person (or object of interest) 104 moving through the environment 100 from times $t_0$ to $t_2$. The person 104 crosses the entryway 102 and enters the environment 100 between times to and $t_1$. Because this movement occurs within the FOV 116, the motion sensing component 114 triggers the image capture component 112 to capture one or more images of the environment between times to and $t_1$. The motion-activated camera 110 (or the processor executing the people counting application) determines, based on the trajectory of the person 104 across the captured images, that the person 104 has entered the environment 100. Thus, the motion-activated camera 110 may update (or increment) a count value based on the movements of the person 104 between times to and As shown in FIG. 1, the person 104 continues to move through the environment between times $t_1$ and $t_2$. Because this subsequent movement also occurs within the FOV 116, the motion sensing component 114 triggers the image capture component 112 to capture one or more images of the environment between times $t_1$ and $t_2$. However, the motion-activated camera 110 may determine, based on the trajectory of the person 104 in the captured images, that the person 104 has not entered nor exited the environment 100. Thus, the motion-activated camera 110 does not update the count value based on the movements of the person 104 between times $t_1$ and $t_2$. In other words, the movements of the person 104 between times $t_1$ and $t_2$ result in a false trigger by the motion-activated camera 110.

A false trigger may occur when the motion-activated camera 110 senses motion in the environment 100 (based on movement detected in the FOV 116 of the motion sensing component 114) but does not update a count value (based on images captured by the image capture component 112 responsive to the detected motion). As described above, false triggers may unnecessarily drain power, memory, or processing resources of the motion-activated camera 110. In some aspects, the motion-activated camera 110 may dynamically change the FOV of the motion sensing component 114 to reduce false triggers. In some implementations, the motion sensing component 114 may monitor a narrower FOV when a persistent object of interest is detected in its wide FOV (such as the FOV 116).

A persistent object of interest is any object of interest (such as the person 104) that persists or otherwise remains in the wide FOV of the motion sensing component 114. As such, movements or motion by the persistent object of interest may cause false triggers in the motion-activated camera 110. In some implementations, the narrower FOV may be narrowly focused on the threshold region of the environment 100 (such as the entryway 102). In some implementations, the motion sensing component 114 may once again monitor its wide FOV when the persistent object of interest is no longer detected in the wide FOV. As such, aspects of the present disclosure may balance the benefits of early motion detection with the benefits of false trigger reduction based on knowledge of persistent objects of interest in the environment 100.

Figure 2:
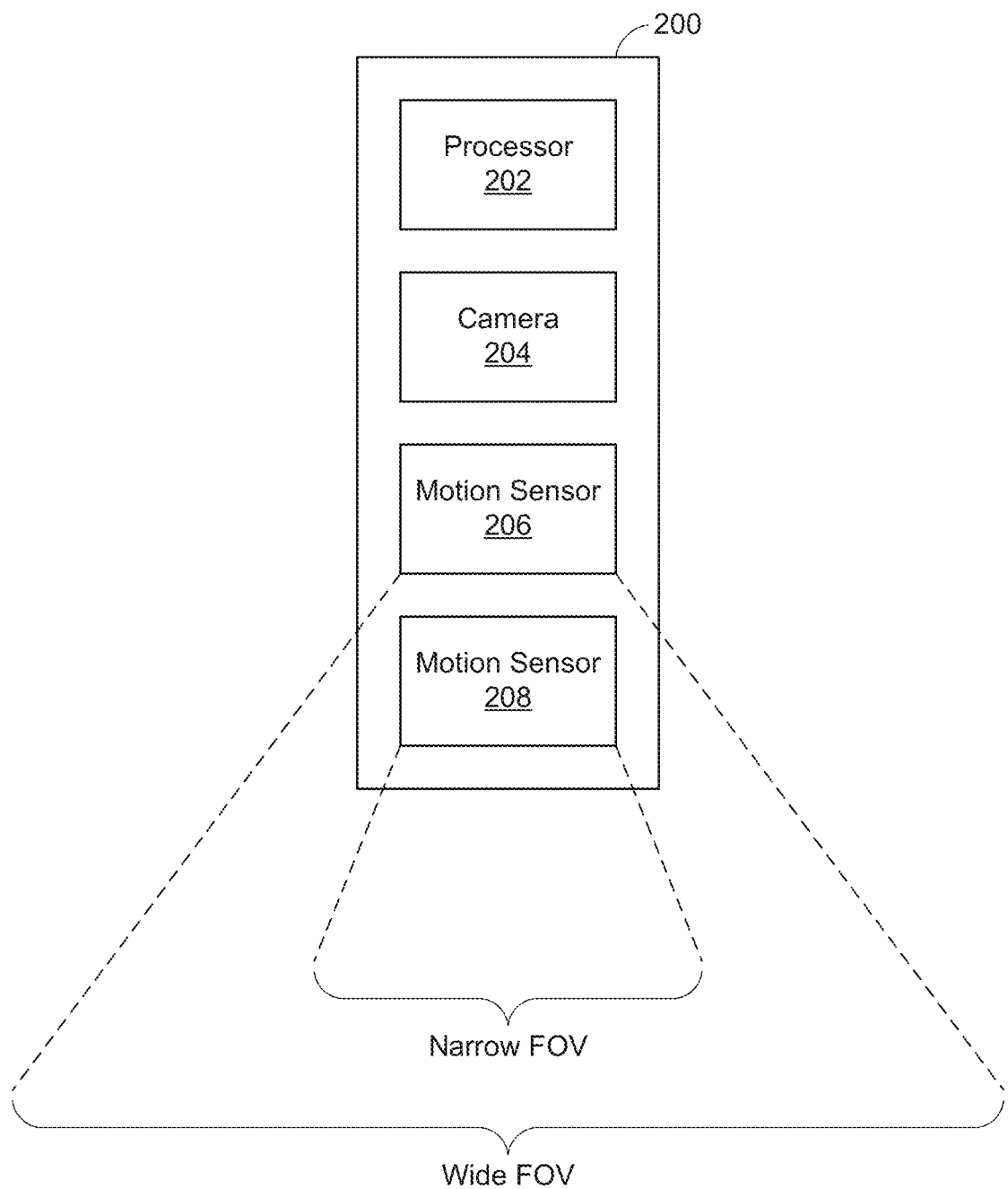
FIG. 2 shows a block diagram of a motion-activated camera system, according to some implementations.

FIG. 2 shows a block diagram of a motion-activated camera system 200, according to some implementations. In some implementations, the motion-activated camera system 200 may be one example of the motion-activated camera 110 of FIG. 1. For example, the camera system 200 may be implemented as a people counter configured to count a number of persons (or objects of interest) passing through a given region of an environment.

The camera system 200 includes a processor 202, a camera 204, a first motion sensor 206, and a second motion sensor 208. With reference for example to FIG. 1, the image capture component 112 may include the camera 204 and the motion sensing component 114 may include the motions sensors 206 and 208. The camera 204 may include a complementary metal-oxide-semiconductor (CMOS) image sensor array, a charge-coupled device (CCD) array, or any other sensors capable of detecting wavelengths of light in the visible spectrum, the infrared spectrum, or the ultraviolet spectrum. Each of the motion sensors 206 and 208 may include a passive infrared (PIR) sensor, a microwave (MW) sensor, an area reflective sensor, an ultrasonic motion sensor, or any other sensors capable of detecting motion within a given FOV.

In some implementations, the first motion sensor 206 may have a relatively wide FOV and the second motion sensor 208 may have a narrower FOV than the first motion sensor 206. In some aspects, the camera system 200 may be configured to operate in a wide-FOV mode or a narrow-FOV mode. When the camera system 200 operates in the wide-FOV mode, the first motion sensor 206 controls activation of the camera 204 and processor 202 (based on motion detected in the wide FOV). When the camera system 200 operates in the narrow-FOV mode, the second motion sensor 208 (rather than the first motion sensor 206) controls activation of the camera 204 and processor 202 (based on motion detected in the narrow FOV).

In some implementations, activation of the camera 204 may cause the camera 204 to capture one or more images of a scene (such as the environment 100 of FIG. 1). In some implementations, activation of the processor 202 may cause the processor 202 to execute a people counting application or software. For example, the processor 202 may detect and track one or more objects of interest across the captured images to determine whether the movements of the objects satisfy a condition for updating a count value (such as crossing a threshold region within the scene). In some aspects, the processor 202 may further determine whether the scene includes a persistent object of interest. For example, a persistent object of interest may be any object that is detected across multiple (such as a threshold number of) images captured in response to multiple motion triggers.

In some implementations, the camera system 200 may dynamically change its configuration between the wide-FOV mode and the narrow-FOV mode based on the presence (or absence) of persistent objects of interest in the scene. More specifically, the camera system 200 may operate in the wide-FOV mode as long as no persistent object of interest is detected in the scene. When the processor 202 detects a persistent object of interest, the camera system 200 may switch to the narrow-FOV mode and may continue to operate in the narrow-FOV mode until the processor 202 determines that the persistent object of interest has left the scene. In other words, when the persistent object of interest is no longer detected in the scene, the camera system 200 may switch back to the wide-FOV mode.

Figure 3:
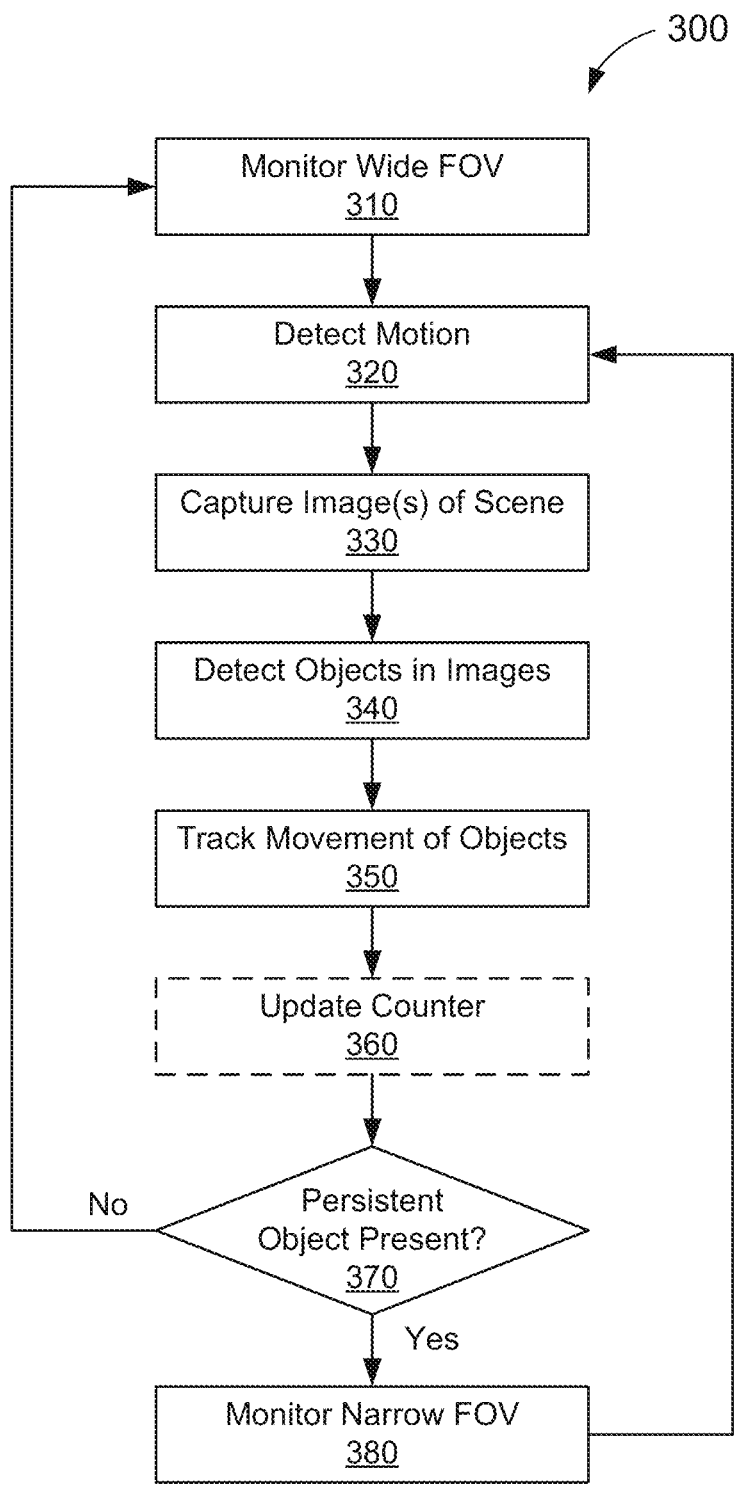
FIG. 3 shows an illustrative flowchart depicting an example operation of a motion-activated camera, according to some implementations.

FIG. 3 shows an illustrative flowchart depicting an example operation 300 of a motion-activated camera, according to some implementations. More specifically, the example operation 300 may be performed by a motion-activated camera that is capable of operating in a wide-FOV mode and a narrow-FOV mode. In some implementations, the motion-activated camera may be one example of the motion-activated camera system 200 of FIG. 2.

The motion-activated camera initially operates in the wide-FOV mode and monitors a wide FOV for motion (310). For example, the camera system 200 may monitor an output of the first motion sensor 206 having the wide FOV. When the motion-activated camera detects motion in the wide FOV (320), the motion-activated camera proceeds to capture one or more images of a scene (330). For example, the first motion sensor 206 may output a motion trigger responsive to detecting motion in its wide FOV. The camera system 200 may activate the camera 204 and the processor 202 in response to the motion trigger output by the first motion sensor 206. Upon activation, the camera 204 may capture one or more images (or frames of video) of a scene.

The motion-activated camera may detect one or more objects in the captured images (340) and track the movements of the objects in the scene (350). For example, the processor 202 may execute a people counting application that is configured to detect and track objects of interest in images. In some implementations, the motion-activated camera may update a counter based on the movements of the objects (360). For example, in executing the people counting application, the processor 202 may update a count value if an object of interest crosses a threshold region in the scene. More specifically, the processor 202 may increment or decrement the count value depending on the direction in which the object of interest moves across the threshold region.

The motion-activated camera further determines whether a persistent object of interest is present in the captured images (370). For example, the processor 202 may determine whether any of the objects of interest (detected at 340) were also detected in one or more images captured in response to a previous motion trigger. More specifically, the processor 202 may detect the present of a persistent object of interest if one or more of the objects of interest detected in response to the most recent motion trigger also were detected in response to the previous motion trigger. If no persistent object of interest is detected in the scene (at 370), the motion-activated camera my continue to monitor its wide FOV for motion (310).

If a persistent object of interest is detected in the scene (at 370), the motion-activated camera may operate in the narrow-FOV mode and proceed to monitor a narrow FOV, in lieu of the wide FOV, for motion (380). For example, the camera system 200 may monitor an output of the second motion sensor 208 having the narrow FOV (in lieu of monitoring the first motion sensor 206). Thereafter, when the motion-activated camera detects motion in the narrow FOV (320), the motion-activated camera proceeds to capture one or more images of a scene (330). For example, the second motion sensor 208 may output a motion trigger responsive to detecting motion in its narrow FOV. The camera system 200 may activate the camera 204 and the processor 202 in response to a motion trigger output by the second motion sensor 208.

The motion-activated camera may proceed to perform another people counting operation, for example, by detecting one or more objects in the captured images (340), tracking the movements of the objects in the scene (350), and updating the counter based on the movements of the objects (360). As shown in FIG. 3, the motion-activated camera continues to operate in the narrow FOV mode until the persistent object of interest is no longer detected in the scene (at 370). More specifically, when the persistent object of interest is no longer detected in the scene (at 370), the motion-activated camera may switch back to the wide-FOV mode and proceed to monitor the wide FOV, in lieu of the narrow FOV, for motion (310).

FIGS. 4A-4D show example changes to a people-counting environment 400A-400D, respectively, over a period of time. a people-counting environment, according to some implementations. The people-counting environment includes an entryway (or doorway) 402 and a motion-activated camera 410. In the examples of FIGS. 4A-4D, the motion-activated camera 410 may be implemented as a people counter configured to count a number of persons (or objects of interest) passing through the entryway 402. Thus, as shown in FIGS. 4A-4D, the motion-activated camera 410 is positioned above, and facing, the entryway 402.

The motion-activated camera 410 includes an image capture component 412 and a motion sensing component 414. The motion sensing component 414 is configured to detect movement of objects in its FOV. The image capture component 412 is configured to capture one or more images of a scene responsive to movement detected by the motion sensing component 414. For example, the motion sensing component 414 may generate or output a motion trigger or signal responsive to detecting movement in its FOV. The motion trigger activates or otherwise causes the image capture component 412 to capture images of the environment.

In some implementations, the motion-activated camera 410 may be one example of the motion-activated camera system 200 of FIG. 2. For example, the image capture component 412 may include the camera 204 and the motion sensing component 414 may include the motion sensors 206 and 208. Accordingly, the motion-activated camera 410 may be operable in wide-FOV mode and a narrow-FOV mode. When operating in the wide-FOV mode, the motion sensing component 414 is configured to detect motion in a wide FOV 416 (such as the FOV of the first motion sensor 206). When operating in the narrow-FOV mode, the motion sensing component 414 is configured to detect motion in a narrow FOV 418 (such as the FOV of the second motion sensor 208).

A processor of the motion-activated camera 410 (such as the processor 202 of FIG. 2) analyzes the captured images to determine whether a person (or other object of interest) is entering or exiting the environment via the entryway 402. For example, the processor 202 may execute a people counting application that detects one or more persons in the captured images and tracks their movements relative to the environment. More specifically, the processor 202 may determine whether a person crosses a threshold region in the captured images (such as the entryway 102) and may update a count value each time a person crosses the threshold. For example, the processor 202 may increment the count value when a person enters the environment and may decrement the count value when a person exits the environment.

In some implementations, the processor may be configured to detect one or more persistent objects of interest in the captured images. For example, a persistent object of interest may be any object that is detected across multiple images captured in response to multiple motion triggers. In some implementations, the motion-activated camera 410 may dynamically switch between the wide-FOV mode and the narrow-FOV made based on the presence (or absence) of persistent objects of interest in the captured images. For example, the motion-activated camera 410 may operate in the wide-FOV mode when no persistent objects of interest are detected in the captured images and may operate in the narrow-FOV mode when one or more persistent objects of interest are detected in the captured images.

Figure 4A:
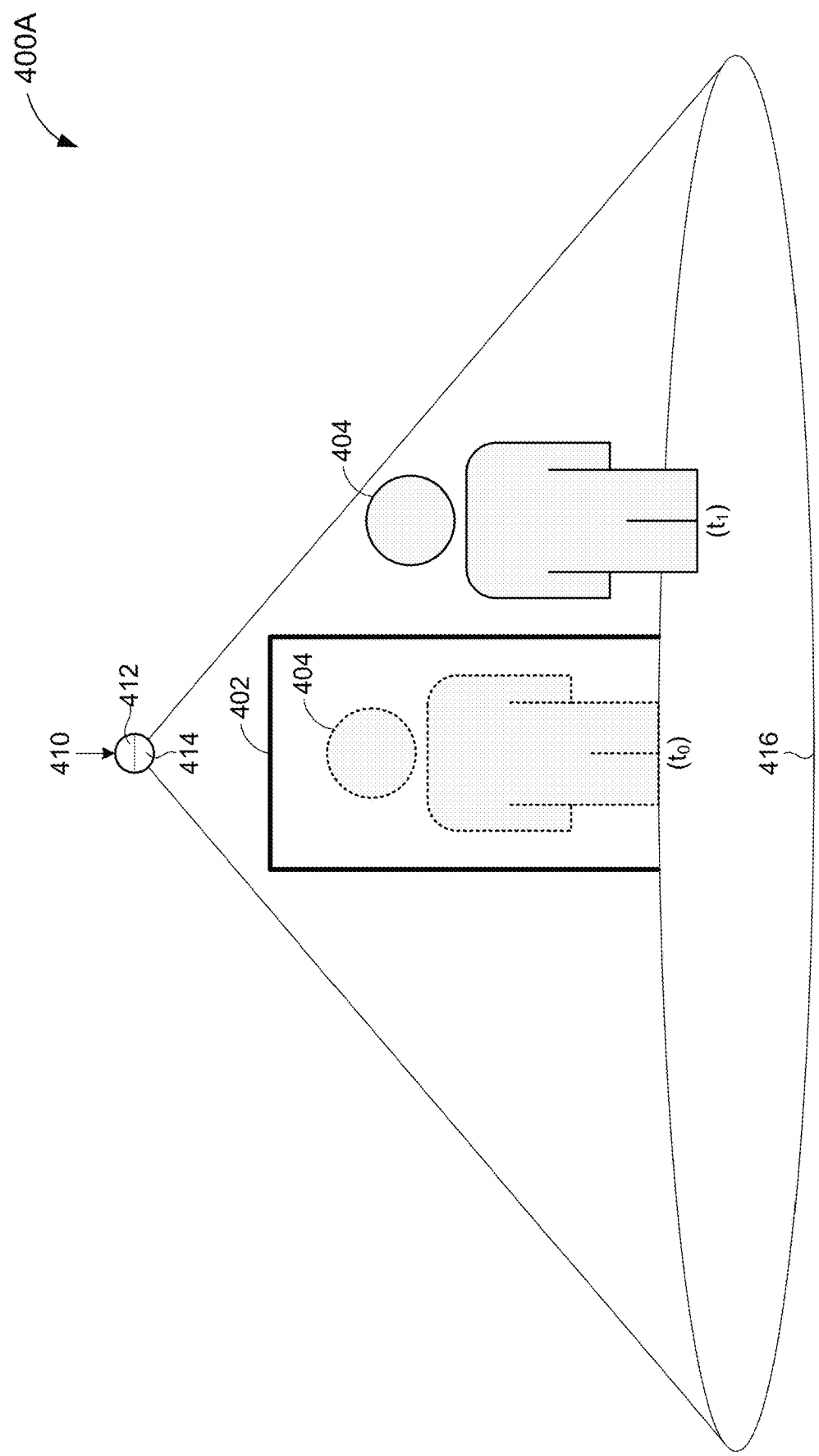
Figure 4B:
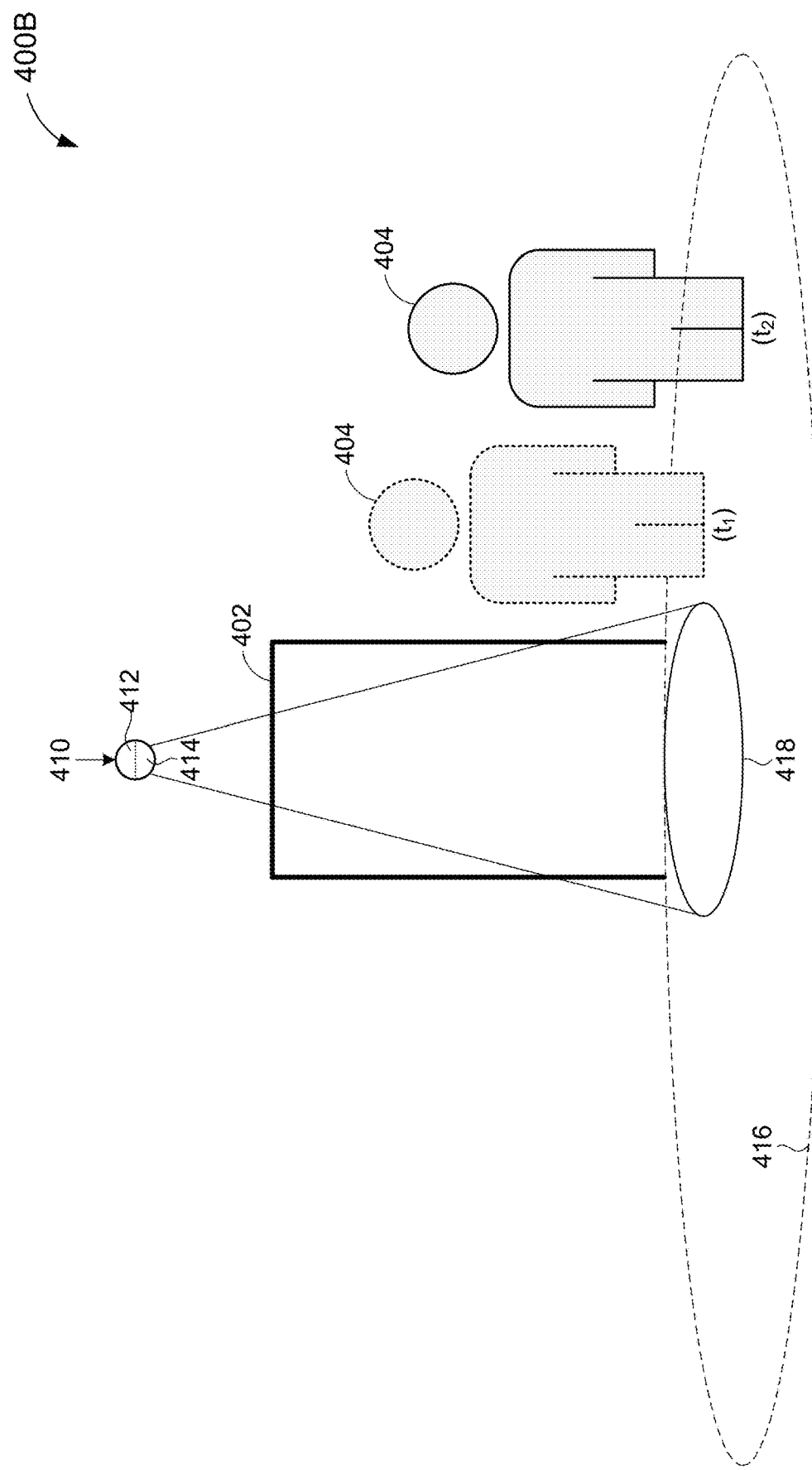

As shown in FIG. 4A, the motion-activated camera 410 is initially configured to operate in the wide-FOV mode (and is configured to detect motion in the wide FOV 416). A person (or object of interest) 404 crosses the entryway 402 and enters the environment 400A between times to and $t_1$. Because this movement occurs within the wide FOV 416, the motion sensing component 414 triggers the image capture component 412 to capture one or more images of the environment 400A between times to and $t_1$. The motion-activated camera 410 (or the processor executing the people counting application) determines, based on the trajectory of the person 404 across the captured images, that the person 404 has entered the environment 400A. Accordingly, the motion-activated camera 410 may update (or increment) a count value based on the movements of the person 404 between times to and As shown in FIG. 4B, the person 404 continues to move within the environment 400B between times $t_1$ and $t_2$. At time $t_1$, the motion-activated camera 410 is still configured to operate in the wide-FOV mode. Thus, because this movement occurs within the wide FOV 416, the motion sensing component 414 triggers the image capture component 412 to capture one or more images of the environment 400B between times $t_1$ and $t_2$. However, the motion-activated camera 410 may determine, based on the trajectory of the person 404 in the capture images, that the person 404 has not entered nor exited the environment 400B. Thus, the motion-activated camera 410 does not update the count values based on the movements of the person 404 between times $t_1$ and $t_2$. In other words, the movements of the person 404 between times $t_1$ and $t_2$ result in a false trigger by the motion-activated camera 410.

In some implementations, the motion-activated camera 410 may identify the person 404 as a persistent object of interest due to the false trigger condition. More specifically, the motion-activated camera 410 may determine that the person 404 has remained in the scene (or in the wide FOV 416) since the previous motion trigger (between times to and $t_1$) but has not crossed the threshold region (such as the entryway 402) in any of the images captured in response to the recent motion trigger (between times $t_1$ and $t_2$). In some implementations, the motion-activated camera 410 may switch from the wide-FOV mode to the narrow-FOV mode (and is configured to detect motion in the narrow FOV 418) responsive to detecting the presence of the persistent object of interest (such as the person 404).

As shown in FIG. 4C, the person 404 proceeds to move out of the wide FOV 416 between times $t_2$ and $t_3$. Meanwhile, another person 406 approaches the entryway 402 at time $t_3$. At time $t_2$, the motion-activated camera 410 is still configured to operate in the narrow-FOV mode. Because the movements of the person 404 occur outside the narrow FOV 418, and because the person 406 has not yet entered the narrow FOV 418, the motion sensing component 414 does not trigger the image capture component 412 to capture images of the environment 400C between times $t_2$ and $t_3$. As such, the additional movements of the person 404 (between times $t_2$ and $t_3$) do not result in a false trigger by the motion-activated camera 410. Moreover, the motion-activated camera 410 may continue operation in the narrow-FOV mode.

Figure 4D:
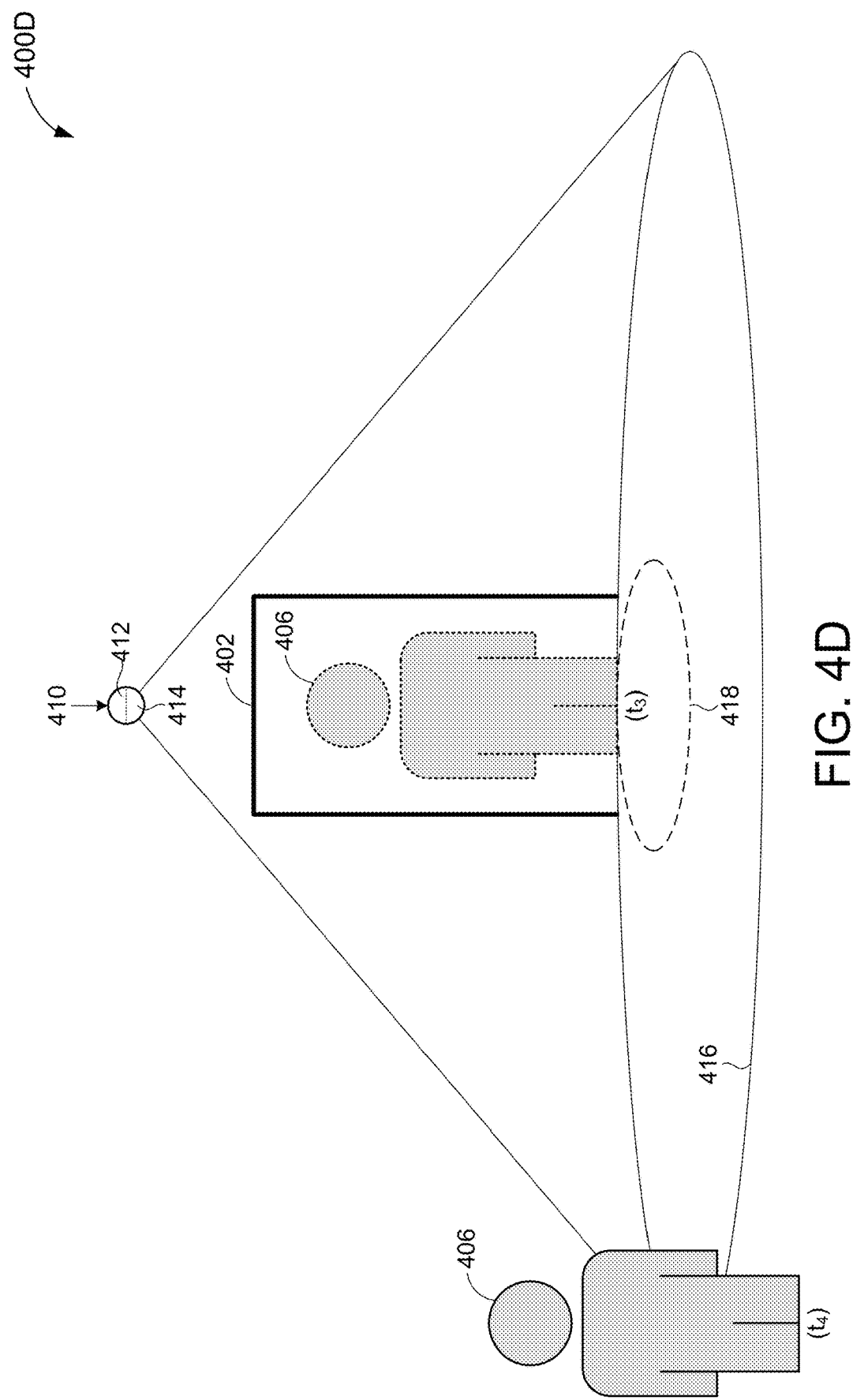

As shown in FIG. 4D, the person 406 crosses the entryway 402 and enters the environment 400D between times $t_3$ and $t_4$. At time $t_3$, the motion-activated camera 410 is still configured to operate in the narrow-FOV mode. Thus, because this movement occurs within the narrow FOV 418, the motion sensing component 414 triggers the image capture component 412 to capture one or more images of the environment 400D between times $t_3$ and $t_4$. The motion-activated camera 410 determines, based on the trajectory of the person 406 across the captured images, that the person 406 has entered the environment 400D. Accordingly, the motion-activated camera 410 may update (or increment) a count value based on the movements of the person 406 between times $t_3$ and $t_4$.

In some implementations, the motion-activated camera 410 may determine that the persistent object of interest (such as the person 404) is no longer present in the captured images (or has at least exited the wide FOV 416). In such implementations, the motion-activated camera 410 may switch from the narrow-FOV mode back to the wide-FOV mode (and is configured to detect motion in the wide FOV 416) responsive to detecting the absence of the persistent object of interest (such as the person 404). At time $t_4$, the person 406 is also outside the wide FOV 416. As such, the person 406 may not be detected as a persistent object of interest responsive to a subsequent activation of the motion-activated camera 410.

Figure 5:
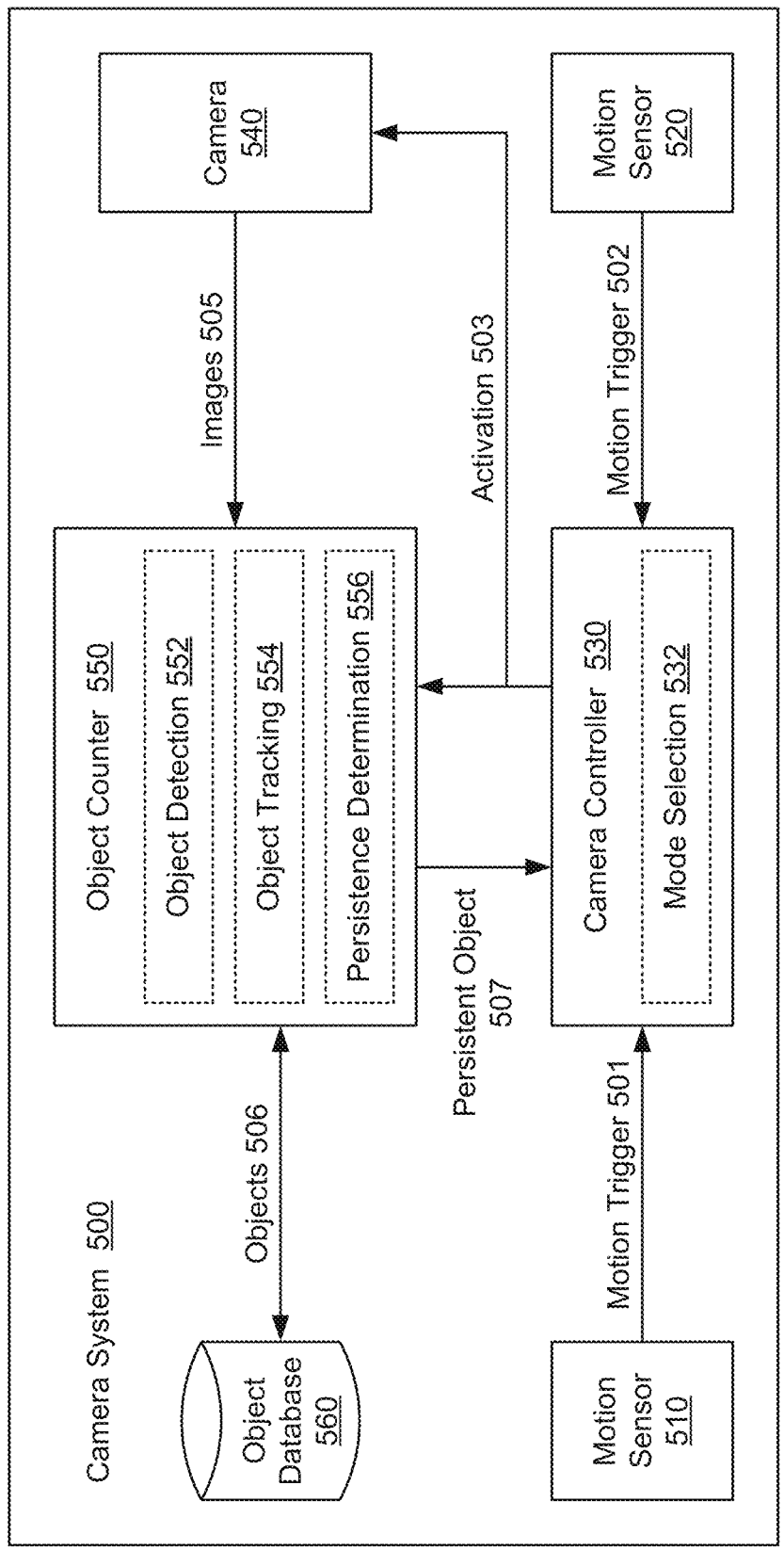
FIG. 5 shows a block diagram of a motion-activated camera system, according to some implementations.

FIG. 5 shows a block diagram of a motion-activated camera system 500, according to some implementations. In some implementations, the motion-activated camera system 500 may be one example of the motion-activated camera system 200 of FIG. 2 or the motion-activated camera 410 of FIGS. 4A-4D. For example, the camera system 500 may be implemented as a people counter configured to count a number of persons (or objects of interest) passing through a given region of an environment.

In some implementations, the camera system 500 may include a first motion sensor 510, a second motion sensor 520, a camera controller 530, a camera 540, and an object counter 550, and an object database 560. In some implementations, the camera 540 may be one example of the camera 204 of FIG. 2. Thus, the camera 540 may include a CMOS image sensor array, a CCD array, or any other sensors capable of detecting wavelengths of light in the visible spectrum, the infrared spectrum, or the ultraviolet spectrum. In some implementations, the motion sensors 510 and 520 may be examples of the motion sensors 206 and 208, respectively, of FIG. 2. Thus, each of the motion sensors 510 and 520 may include a PIR sensor, an MW sensor, an area reflective sensor, an ultrasonic motion sensor, or any other sensors capable of detecting motion within a given FOV.

In some implementations, the first motion sensor 510 may have a relatively wide FOV and the second motion sensor 520 may have a narrower FOV than the first motion sensor 510. More specifically, the narrow FOV of the second motion sensor 520 may reside within the wide FOV of the first motion sensor 510. In some implementations, the FOVs for the first and second motion sensors 510 and 520 may each be centered around (or otherwise positioned relative to) a region of the environment associated with a people counting application (such as the entryway 402 of FIG. 4). The first motion sensor 510 may be configured to output a first motion trigger 501 in response to detecting motion in the wide FOV. The second motion sensor 520 may be configured to output a second motion trigger 502 in response to detection motion in the narrow FOV.

The camera controller 530 is configured to output an activation signal 503 based on the motion triggers 501 or 502. In some implementations, the camera controller 530 may include a mode selection component 532 that is configured to selectively operate the camera controller 530 in a wide-FOV mode or a narrow-FOV mode. When operating in the wide-FOV mode, the camera controller 530 monitors the output of the first motion sensor 510 (in lieu of the second motion sensor 520). As such, the camera controller 530 may output the activation signal 503 responsive to the first motion trigger 501. When operating in the narrow-FOV mode, the camera controller 530 monitors the output of the second motion sensor 520 (in lieu of the first motion sensor 510). As such, the camera controller 530 may output the activation signal 503 responsive to the second motion trigger 502.

The camera 540 responds to the activation signal 503 by capturing one or more images (or frames of video) 505 of the environment. The object counter 550 responds to the activation signal 503 by processing the images 505 to determine whether to update a count value. In some implementations, the object counter 550 may include an object detection component 552, an object tracking component 554, and a persistence determination component 556. The object detection component 552 is configured to detect objects of interest (such as persons) in the captured images 505. For example, the object detection component 552 may detect objects of interest using machine learning or various non-neural object detection algorithms.

The object tracking component 554 is configured to track the movements or trajectories of the detected objects across multiple images or frames of video. In some implementations, the object tracking component 554 may determine and indicate whether one or more detected objects move across a threshold region of the environment. The object counter 550 may update the count value responsive to each object of interest that cross the threshold region. For example, the object counter 550 may increment the count value when an object of interest crosses the threshold region in a first direction (such as to enter the environment) and may decrement the count value when an object of interest crosses the threshold region in a second direction (such as to exit the environment).

The persistence determination component 556 is configured to determine whether the images 505 include a persistent object of interest. For example, the persistence determination component 556 may compare the objects detected in the images 505 (such as within a region encompassed by the wide FOV of the first motion sensor 510) with a set of objects 506 stored in an object database or repository 560. The objects 506 may represent previously-detected objects from one or more images captured in response to a prior activation of the camera 540. For example, each time the camera 540 captures one or more images 505 (in response to an activation signal 503), the persistence determination component 556 may update the object database 560 to include any objects of interest detected in the recently captured images 505.

If an object detected in one or more of the images 505 matches an object 506 already stored in the database 560, the persistence determination component 556 may further determine whether the object moved across the threshold region in the images 505 (resulting in an update to the count value) based on the indications provided by the object tracking component 554. The matching object may be identified as a persistent object of interest if it does not cross the threshold region. In some implementations, the persistence determination component 556 may assert a persistent object signal 507 in response to determining that a persistent object of interest is present in the captured images 505. In some other implementations, the persistence determination component 556 may deassert the persistent object signal 507 in response to determining that a persistent object of interest is not (or no longer) present in the captured images 505.

In some aspects, the mode selection component 532 may select between the wide-FOV mode or the narrow-FOV mode based on whether the persistent object signal 507 indicates that a persistent object of interest is present (or absent) in the captured images 505 (or within the wide FOV of the first motion sensor 510). In some implementations, the mode selection component 532 may operate the camera controller 530 in the wide-FOV mode as long as the persistent object signal 507 is deasserted (or otherwise indicates that no persistent object is detected in the wide FOV). In some other implementations, the mode selection component 532 may operate the camera controller 530 in the narrow-FOV mode when the persistent object signal 507 is asserted (or otherwise indicates that a persistent object is detected in the wide FOV).

Figure 6:
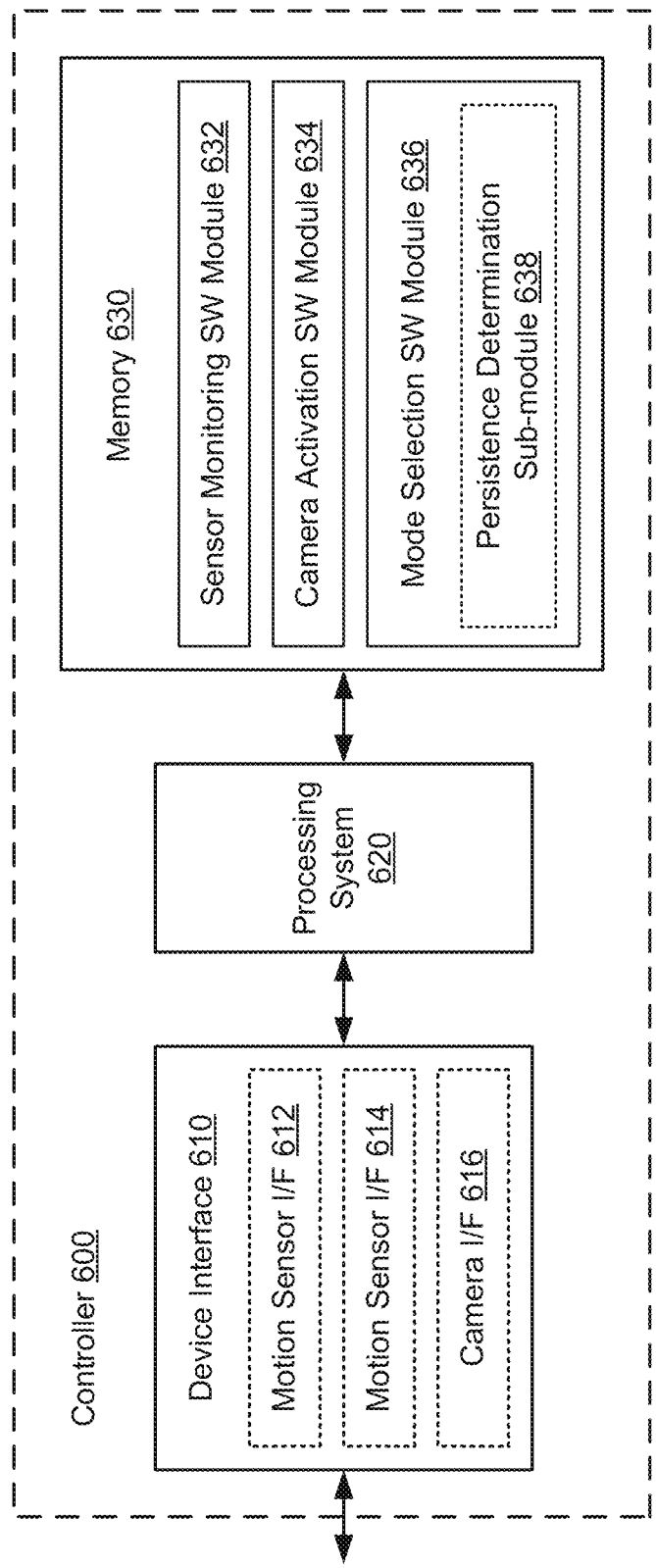
FIG. 6 shows a block diagram of a controller for a motion-activated camera system, according to some implementations.

FIG. 6 shows a block diagram of a controller 600 for a motion-activated camera system, according to some implementations. In some implementations, the motion-activated camera system may be one example of the motion-activated camera 410 of FIGS. 4A-4D or any of the motion-activated camera systems 200 or 500 of FIGS. 2 and 5, respectively. For example, the motion-activated camera system may be operable in a wide-FOV mode and a narrow-FOV mode. In some implementations, the controller 600 may include a device interface 610, a processing system 620, and a memory 630.

The device interface 610 is configured to communicate with one or more components of the camera system. In some implementations, the device interface 610 may include a first motion sensor interface (I/F) 612, a second motion sensor interface 614, and a camera interface 616. The first motion sensor interface 612 may receive motion triggers output by a first motion sensor of the camera system (such as any of the motion sensors 206 or 510 of FIGS. 2 and 5, respectively). The second motion sensor interface 614 may receive motion triggers output by a second motion sensor of the camera system (such as any of the motion sensors 208 or 520 of FIGS. 2 and 5, respectively). The camera interface 616 may output camera activation signals (or triggers) to a camera of the camera system (such as any of the cameras 204 or 540 of FIGS. 2 and 5, respectively).

The memory 630 may include a non-transitory computer-readable medium (including one or more nonvolatile memory elements, such as EPROM, EEPROM, Flash memory, a hard drive, and the like) that may store at least the following software (SW) modules:

a sensor monitoring SW module 632 to monitor an output of the first motion sensor or the second motion sensor based on whether the motion-activated camera system operates in the wide-FOV mode or the narrow-FOV mode;

a camera activation SW module 634 to trigger the camera to capture one or more images of a scene responsive to motion triggers output by the first motion sensor or the second motion sensor; and a mode selection SW module 636 to selectively operate the motion-activated camera system in the wide-FOV mode or the narrow-FOV mode, the mode selection SW module 636 including:

a persistence determination sub-module 638 to determine whether the images captured by the camera include a persistent object of interest and to select between the wide-FOV mode or the narrow-FOV mode based on whether the captured images include a persistent object of interest.

Each software module includes instructions that, when executed by the processing system 620, causes the controller 600 to perform the corresponding functions.

The processing system 620 may include any suitable one or more processors capable of executing scripts or instructions of one or more software programs stored in the controller 600 (such as in memory 630). For example, the processing system 620 may execute the sensor monitoring SW module 632 to monitor an output of the first motion sensor or the second motion sensor based on whether the motion-activated camera system operates in the wide-FOV mode or the narrow-FOV mode. The processing system 620 also may execute the camera activation SW module 634 to trigger the camera to capture one or more images of a scene responsive to motion triggers output by the first motion sensor or the second motion sensor.

The processing system 620 may execute the mode selection SW module 636 to selectively operate the motion-activated camera system in the wide-FOV mode or the narrow-FOV mode. In executing the mode selection SW module 636, the processing system may further execute the persistence determination sub-module 638 to determine whether the images captured by the camera include a persistent object of interest and to select between the wide-FOV mode or the narrow-FOV mode based on whether the captured images include a persistent object of interest.

Figure 7:
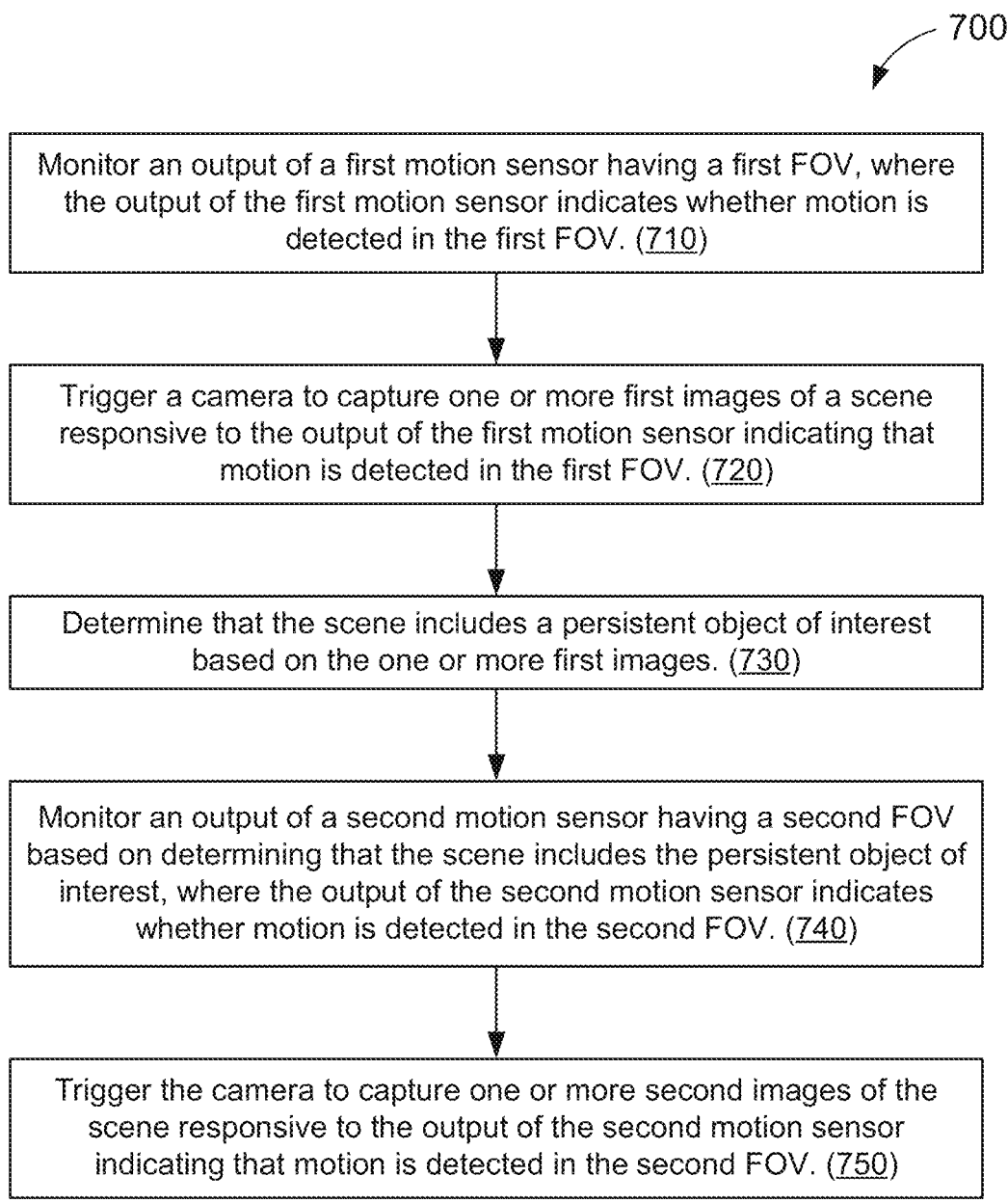
FIG. 7 shows an illustrative flowchart depicting an example operation for controlling a motion-activated camera system, according to some implementations.

FIG. 7 shows an illustrative flowchart depicting an example operation 700 for controlling a motion-activated camera system, according to some implementations. In some implementations, the example operation 700 may be performed by a controller for a motion-activated camera system (such as the controller 600 of FIG. 6).

The controller may monitor an output of a first motion sensor having a first FOV, where the output of the first motion sensor indicates whether motion is detected in the first FOV (710). The controller may trigger a camera to capture one or more first images of a scene responsive to the output of the first motion sensor indicating that motion is detected in the first FOV (720). The controller may further determine that the scene includes a persistent object of interest based on the one or more first images (730). In some implementations, the controller may determine that the scene includes a persistent object of interest by detecting a presence of the persistent object of interest in a threshold number of images captured by the camera.

The controller may monitor an output of a second motion sensor having a second FOV based on determining that the scene includes the persistent object of interest, where the output of the second motion sensor indicates whether motion is detected in the second FOV (740). In some implementations, the second FOV may be narrower than the first FOV. In some implementations, the first FOV may encompass the second FOV. In some implementations, the controller may monitor the output of the second motion sensor in lieu of monitoring the output of the first motion sensor.

The controller triggers the camera to capture one or more second images of the scene responsive to the output of the second motion sensor indicating that motion is detected in the second FOV (750). In some implementations, the controller may further determine that the persistent object of interest is absent form the scene based on the one or more second images. In such implementations, the controller may monitor the output of the first motion sensor based on determining that the persistent object of interest is absent from the scene.

In some implementations, the controller may further count a number of objects traversing a threshold region of the scene based on the one or more first images. In such implementations, the controller may update the count of the number of objects traversing the threshold region based on the one or more second images. In some implementations, the threshold region may be located within each of the first and second FOVs.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for controlling a camera system, comprising:
    monitoring an output of a first motion sensor having a first field-of-view (FOV), the output of the first motion sensor indicating whether motion is detected in the first FOV;
    triggering a camera to capture one or more first images of a scene responsive to the output of the first motion sensor indicating that motion is detected in the first FOV;
    determining that the scene includes a persistent object of interest based on the one or more first images;
    monitoring an output of a second motion sensor having a second FOV based on determining that the scene includes the persistent object of interest, the output of the second motion sensor indicating whether motion is detected in the second FOV; and
    triggering the camera to capture one or more second images of the scene responsive to the output of the second motion sensor indicating that motion is detected in the second FOV.

2. The method of claim 1, wherein the second FOV is narrower than the first FOV.

3. The method of claim 2, wherein the first FOV encompasses the second FOV.

4. The method of claim 1, wherein the output of the second motion sensor is monitored in lieu of monitoring the output of the first motion sensor.

5. The method of claim 1, wherein the determining that the scene includes a persistent object of interest comprises:
    detecting a presence of the persistent object of interest in a threshold number of images captured by the camera.

6. The method of claim 1, further comprising:
    counting a number of objects traversing a threshold region of the scene based on the one or more first images.

7. The method of claim 6, further comprising:
    updating the count of the number of objects traversing the threshold region based on the one or more second images.

8. The method of claim 6, wherein the threshold region is located within each of the first and second FOVs.

9. The method of claim 1, further comprising:
    determining that the persistent object of interest is absent from the scene based on the one or more second images; and
    monitoring the output of the first motion sensor based on determining that the persistent object of interest is absent from the scene.

10. The method of claim 9, wherein the output of the first motion sensor is monitored in lieu of monitoring the output of the second motion sensor.

11. A controller for a camera system, comprising:
    a processing system; and
    a memory storing instructions that, when executed by the processing system, causes the controller to:
        monitor an output of a first motion sensor having a first field-of-view (FOV), the output of the first motion sensor indicating whether motion is detected in the first FOV;
        trigger a camera to capture one or more first images of a scene responsive to the output of the first motion sensor indicating that motion is detected in the first FOV;
        determine that the scene includes a persistent object of interest based on the one or more first images;
        monitor an output of a second motion sensor having a second FOV based on determining that the scene includes the persistent object of interest, the output of the second motion sensor indicating whether motion is detected in the second FOV; and trigger the camera to capture one or more second images of the scene responsive to the output of the second motion sensor indicating that motion is detected in the second FOV.

12. The controller of claim 11, wherein the second FOV is narrower than the first FOV.

13. The controller of claim 12, wherein the first FOV encompasses the second FOV.

14. The controller of claim 11, wherein the output of the second motion sensor is monitored in lieu of monitoring the output of the first motion sensor.

15. The controller of claim 11, wherein the determining that the scene includes a persistent object of interest comprises:

detecting a presence of the persistent object of interest in a threshold number of images captured by the camera.

16. The controller of claim 11, wherein execution of the instructions further causes the controller to:

count a number of objects traversing a threshold region of the scene based on the one or more first images; and update the count of the number of objects traversing the threshold region based on the one or more second images.

17. The controller of claim 16, wherein the threshold region is located within each of the first and second FOVs.

18. The controller of claim 11, wherein execution of the instructions further causes the controller to:

determine that the persistent object of interest is absent from the scene based on the one or more second images; and monitor the output of the first motion sensor based on determining that the persistent object of interest is absent from the scene.

19. A camera system comprising:

a camera;

a first motion sensor having a first field-of-view (FOV);

a second motion sensor having a second FOV; and a controller configured to:

monitor an output of the first motion sensor that indicates whether motion is detected in the first FOV;

trigger the camera to capture one or more first images of a scene responsive to the output of the first motion sensor indicating that motion is detected in the first FOV;

determine that the scene includes a persistent object of interest based on the one or more first images;

monitor an output of the second motion sensor based on determining that the scene includes the persistent object of interest, the output of the second motion sensor indicating whether motion is detected in the second FOV; and trigger the camera to capture one or more second images of the scene responsive to the output of the second motion sensor indicating that motion is detected in the second FOV.

20. The camera system of claim 19, wherein the controller is further configured to:

determine that the persistent object of interest is absent from the scene based on the one or more second images; and monitor the output of the first motion sensor based on determining that the persistent object of interest is absent from the scene.

* * * * *